United States Patent [19]

Young

[11] 4,353,022
[45] Oct. 5, 1982

[54] TORQUE REVERSING MOTOR CONTROL STRUCTURE AND METHOD

[75] Inventor: Richard A. Young, Little Rock, Ark.

[73] Assignee: The Ceco Corporation, Chicago, Ill.

[21] Appl. No.: 113,058

[22] Filed: Jan. 17, 1980

[51] Int. Cl.³ .......................... H02P 1/44; H02P 3/18
[52] U.S. Cl. ................................... 318/753; 318/785; 318/793
[58] Field of Search ............... 318/790, 793, 789, 785, 318/755, 753

[56] References Cited

U.S. PATENT DOCUMENTS

| 2,864,984 | 12/1958 | Verdier et al. | 318/755 |
| 2,882,045 | 4/1959 | Moore | 318/755 X |
| 3,223,910 | 12/1965 | Greenwald | 318/753 |
| 3,259,824 | 7/1966 | Greenwald | 318/753 |
| 3,601,675 | 8/1971 | Radtke | 318/755 X |
| 3,761,753 | 9/1973 | Fong et al. | 318/793 X |
| 3,855,509 | 12/1974 | Wright | 318/753 |
| 4,117,383 | 9/1978 | Hussey et al. | 318/755 |

Primary Examiner—J. V. Truhe
Assistant Examiner—Richard M. Moose
Attorney, Agent, or Firm—Whittemore, Hulbert & Belknap

[57] ABSTRACT

A torque reversing motor control structure and method for a reversible split phase or capacitive start motor including a centrifugally operated start switch and a transformer controlled motor contactor wherein the primary circuit of the transformer is completed through the start switch to prevent reversing the motor contactor without the motor start switch being closed to insure positive reverse of the motor.

4 Claims, 2 Drawing Figures

TORQUE REVERSING MOTOR CONTROL STRUCTURE AND METHOD

BACKGROUND OF THE INVENTION

1. Field of the Invention

The invention relates to door openers and the like and refers more specifically to a torque reversing motor control structure and method for use with standard split phase or capacitive start motors wherein switching of a contactor used with the motor for reversing the motor is accomplished through a transformer, and the primary circuit of the transformer includes a centrifugal motor start switch in series therewith whereby the motor contactor cannot be reversed without the motor start switch being closed to insure positive reverse of the motor.

2. Description of the Prior Art

Continuous duty motors such as a standard split phase or a capacitive start motor have often been used for opening and closing overhead doors. Such doors present a hard starting load and once in operation requires only about one-third of the starting torque to maintain movement. Continuous duty motors have high starting torque, are constructed for continuous operation, and are available in large quantities.

The problem with standard continuous duty motors as presently used to open and close doors is that during their operation it is possible to experience limit switch overrun. Limit switch overrun with such motors used as door operators may be caused by the centrifugal start switch utilized with such motors not being engaged to provide power to the start winding of such motors when a motor contactor is switched in attempting to reverse direction of motor operation.

In this regard, the centrifugal switch is governed by the speed of the motor and does not usually engage the motor start winding until the motor speed has been reduced to approximately one-quarter of its normal operating speed.

When such continuous duty motors are commanded to stop, momentum causes the door and motor to continue to run so that the centrifugal switch is not closed when the motor contactor is reversed. Accordingly, the start winding is not energized so that the motor does not reverse but will continue to run in the same direction even though the motor contactor is now energized through a circuit controlled by a limit switch operable only with the door travelling in the reverse direction. The door continues to run in the original direction and will not stop due to opening of the limit switch in the direction of actual movement of the door. The door will jam and/or be damaged or cause damage.

Presently, the problem of limit switch overrun in such door operator installations has been solved by adding special switches or relays in the motor control circuit. These switches or relays are wired to delay motor reversing until the centrifugal switch is closed, thereby assuring reversing of the motor.

SUMMARY OF THE INVENTION

In accordance with the structure and method of the present invention, a standard split phase capacitive start motor including a centrifugal start switch, a run winding and a start winding is controlled in accordance with the operation of an associated contactor in a motor control circuit, which contactor has a plurality of auxiliary switches and may be reversed to drive a motor associated therewith in either open or closing directions. The contactor is energized from the secondary of a transformer through a push button switch having open, close and stop push buttons. The primary circuit of the transformer is completed through the start switch of the motor whereby reversing of the contactor and thus of the motor cannot be accomplished prior to closing of the start switch.

Auxiliary switches of the contactor are connected through the secondary winding of the transformer and push button switch to prevent simultaneous completing of a circuit through the open and close contactor relays. Further, the auxiliary switches of the contactor are set to operate only shortly before the actual contact switching takes place to prevent contactor chatter during switching. Limit switches are provided in conjunction with the motor control circuit to provide limited operation of the motor in either direction thereof.

DESCRIPTION OF THE PREFERRED EMBODIMENT

Figure 1:
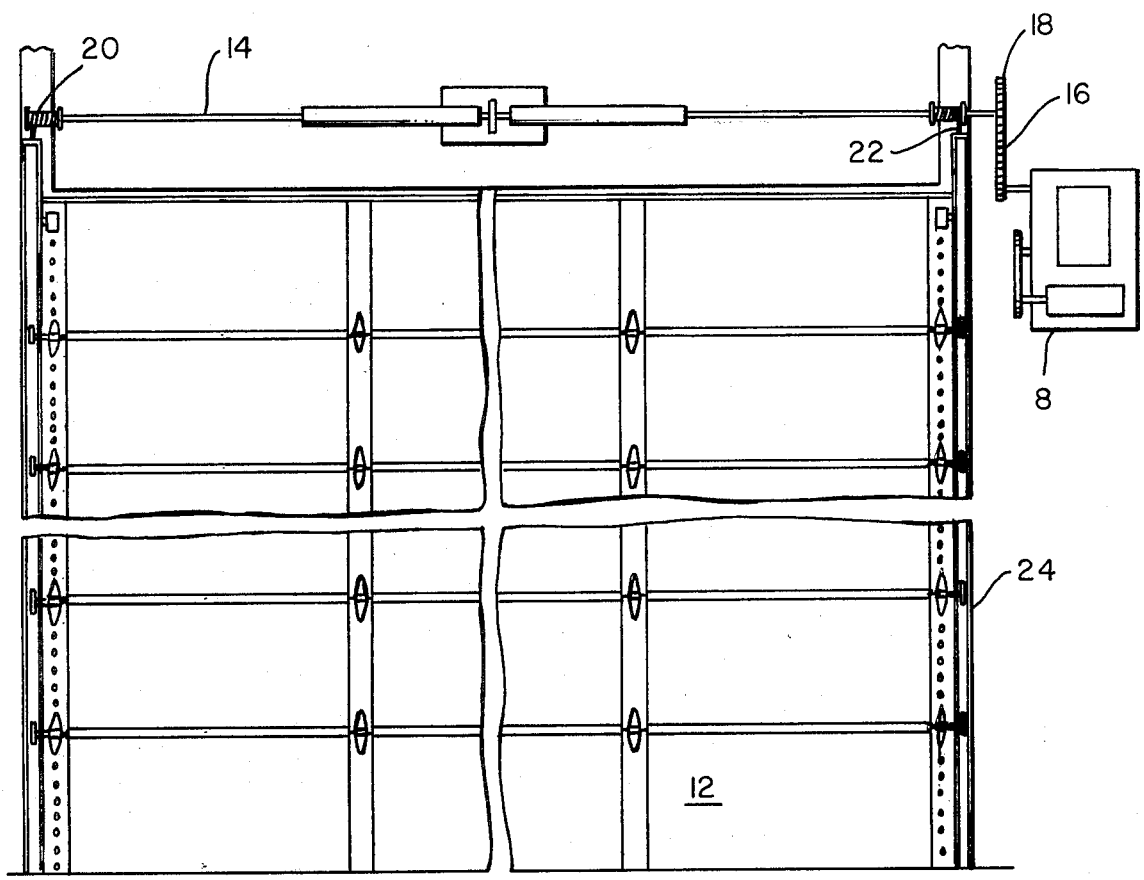
FIG. 1 is a diagrammatic representation of a door opener in position for driving an overhead door, including torque reversing motor control structure in accordance with the invention for effecting the torque reversing motor control method of the invention.

As shown best in FIG. 1, a door operator 8 is utilized to raise and lower a door 12. The operator 8 is connected to a door shaft 14 by a series of chains and sprockets 16 and 18. The shaft 14 rotates drums 20 positioned at each end thereof. Rotation of the drums 20 winds door cable 22 thereon which moves the door 12 in the door tracks 24. The door operator 8 includes and is operably associated with the split phase or capacitive start motor 26, and motor control circuit 10 including motor contactor 28, transformer 30, push button switch 32, and limit switches 34 and 36. Primary power is provided through a primary power circuit 38 including on-off switch 40.

Figure 2:
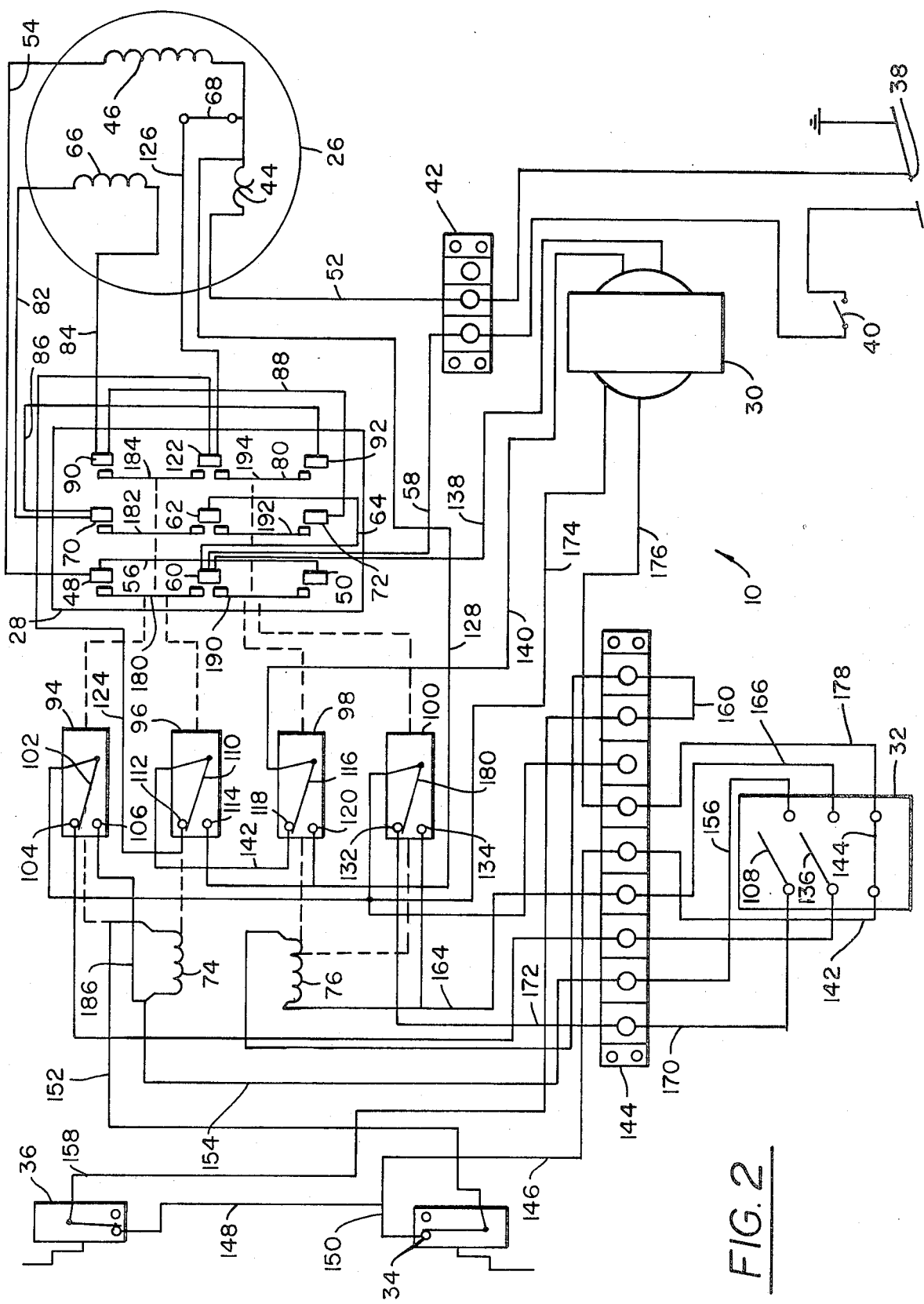
FIG. 2 is a partly diagrammatic, partly schematic diagram of the torque reversing motor control structure of the invention for effecting the method of the invention.

The primary power circuit 38 may be a 110-volt or 220-volt, single-phase, 60-cycle circuit. The power on-off switch 40 merely energizes the power circuit depending on whether the switch 40 is in the on or off position. As shown in FIG. 2, the primary power circuit 38 brings primary power into the terminal board 42 when the on-off switch 40 is in the on position.

Primary power from the terminal board 42 is supplied through an overload relay 44 through the run winding 46 of motor 26 to the top and bottom left contactor terminals 48 and 50 over conductors 52, 54 and 56, as shown best in FIG. 2. The other side of the primary power from the terminal board 42 is supplied through the conductor 58 to the center left terminal 60 of the contactor. From the center left terminal 60 of the contactor 28 the primary power is provided to the center, center terminal 62 of the contactor through conductor 64.

The motor 26 is a standard continuous duty reversible split phase or capacitive start motor and includes the start winding 66 as well as the run winding 46. A start switch 68 is further associated with the motor 26 and is a centrifugally operated switch. Thus, switch 68 is opened when the motor 26 reaches approximately a quarter of its normal operating speed. Also, it closes when the operating speed of the motor is reduced to approximately a quarter of its normal operating speed. The motor 26 is such that on starting, a very high torque is provided when the start winding and run winding are both energized. Further, the start winding is so related to the run winding that reversal of electrical energy through the start winding 66 will cause reversal of the motor 26.

Such continuous duty motors have high starting torque and are readily available in large quantities. Thus, they are particularly useful in door operators wherein the starting load is heavy, but the load is lighter and continuous once the moment of the door is started.

The start winding 66 may be energized from the center center terminal 62 of the contactor 28 in opposite directions through the upper center terminal 70 and lower center terminal 72 depending upon whether the open contactor relay 74 is energized or the close contactor relay 76 is energized, thereby engaging the upper portion 78 or lower portion 80 of the contactor 28 through conductors 82 and 84. Conductors 86 and 88, along with the upper and lower right terminals 90 and 92 of the contactor 28, effect reverse energizing of the start winding 66.

As shown, besides the main contactor terminals and contactor relays 74 and 76, the contactor includes four auxiliary switches 94, 96, 98 and 100. The upper two switches 94 and 96 are actuated by the open contactor relay 74 while the lower two switches 98 and 100 may be moved from their normally open positions shown to their normally closed position on energizing the contactor close relay 76.

Switch 94 includes the movable contact 102, the normally open contact 104 and the normally closed contact 106. The switch 94 is used as an open interlock to maintain the open relay 74 energized after release of the open push button 110 of the push button switch 32, as will be seen subsequently.

Switch 94 further prevents energizing of the close relay 76 while the open relay 74 is energized.

Switch 96 includes the movable contact 110, the normally open contact 112, and the normally closed contact 114. The switch 98 includes the movable terminal 116, the normally open terminal 118, and the normally closed terminal 120. Both the switches 96 and 98 are utilized to maintain the primary circuit of the transformer 30 energized either through the contactor, right center terminal 122 and the motor start switch 68 through the conductors 124 and 126 and subsequently through the overload relay 44, or only through the overload relay 44 through the conductor 128 with the auxiliary switches 96 and 98 in their normally open condition or in their normally closed condition, respectively.

Switch 100 includes the movable contact 130 normally open contact 132 and the normally closed contact 134. The switch 100 is a close interlock and is operable to maintain the close relay energized after the close push button 136 of the push button switch 32 is released. Auxiliary switch 100 further prevents energizing of the open relay 74 while the close relay 76 is energized.

Transformer 30 includes a primary circuit which receives power from one side of the primary power source 38 through conductor 138 from the left center terminal of the contactor 28. The other side of the primary circuit of the transformer 30 is completed either through the conductor 140, switch 98, in normally open position as shown in FIG. 2, conductor 142, switch 96 in the normally open position as shown in FIG. 2, conductor 124, right center terminal 122 of contactor 28, conductor 126, motor start switch 68 and overload relay 44, or through conductor 140, switch 98 in the closed position, or switch 98 in the normally open position, and conductor 142 and switch 96 in the closed position, and conductor 128 and overload relay 44. Thus, it is seen that the primary circuit of the transformer 30 is passed through the centrifugal start switch 68 unless one of the switches 96 or 98 are in the closed position, that is, unless one of the contactor relays 74 and 76 is energized.

The push button switch 32, besides including the open and close push buttons 108 and 136 which are biased open as shown in FIG. 2, includes the stop push button 144 which is biased closed as shown in FIG. 2.

The close limit switch 36 and open limit switch 34 as shown are connected to one side of the stop push button 144 by means of conductor 142, through terminal board 144 and conductors 146, 148 and 150. The other side of the normally closed, open limit switch 34 is connected to one side of the open push button 108 through conductor 152, contactor open solenoid 74, conductor 154, terminal board 144 and conductor 156. The other side of the normally closed, close limit switch 36 is connected to one side of the close push button 136 through conductor 158, terminal board 144, jumper 160, terminal board 144, conductor 162, contactor close relay 76, conductor 164, terminal board 144 and conductor 166.

The open and closed limit switches 34 and 36 are actuated in accordance with the angular position of the motor 26 through gearing provided in connection with the motor 26. They operate to deenergize the motor 26 when the motor is at a set limit of operation in either direction with the door 12 in a limiting up or down position, respectively.

In overall operation of the torque reverse motor control circuit of FIG. 2, the on-off switch 40 is first placed in the on position, that is, switch 40 is closed. This places line voltage from the primary power source 38 on the center left terminal 60 of the contactor 28 and through the overload relay 44 and the run winding 46 on both the upper and lower left contactor terminals 48 and 50 of the contactor 28.

The primary circuit of the transformer 30 is also connected to the center left terminal 60 of the contactor 28 through the conductor 138. The primary winding of the transformer 30 is also connected to the primary power supply 38 through conductor 140, switch 98, conductor 142, switch 96, conductor 124, center right terminal 122 of contactor 28, conductor 126, the closed start switch 68 and thermal overload 44, as shown.

Assuming that the door 12 is closed, open push button 108 of the push button switch 32 is pressed so that it closes and remains closed as long as the operator's finger is positioned thereon. A circuit is thus completed through conductor 170, terminal board 144, conductor 172, close interlock switch 100, conductor 174, secondary winding of transformer 30, conductor 176, terminal board 144, conductor 178, stop push button 144, conductor 142, terminal board 144, conductor 146, open limit switch 34, conductor 152, open relay 74, conductor 154, terminal board 144 and conductor 156. The circuit is thus completed through the secondary of the transformer 30 which includes the open push button 108, the open limit switch 34, the open contactor relay 74 and the close interlock switch 100, in series.

Energizing of the open contactor relay 74 causes the open interlock switch 94 to change positions to the normally closed position, that is, where the movable contact 102 is in engagement with the normally closed contact 106. This prevents energizing of the close contactor relay 76 as long as the open relay 74 is energized.

The switching of the switch 96 causes the upper contactor bars 180, 182 and 184 to move to the right to provide an electrical path between the upper and center, left, center and right contactor terminals. Simultaneously, the switching of the switch 96 deenergizes the primary power of the transformer 30 through the auxiliary switch 96, conductor 124, right center terminal 122 of the contactor 28, conductor 126 and centrifugal start switch 68. The primary circuit of the transformer 30 is however energized through the normally closed contact 114 of the switch 96 and conductor 128 and overload relay 44.

The timing of the switching of switch 96 is such that the switching thereof occurs immediately prior to engagement of the main contactor terminals. Thus, chattering of the contactor due to momentary loss of power in the primary circuit of the transformer 30 is prevented.

Closing of the upper contactor bars 180, 182 and 184 causes energy to flow in the run winding 46 from the primary power source since left upper terminal 48 and left center terminal 60 are now electrically connected to complete the circuit through the primary power supply 38. Similarly, the start winding 66 is energized through the center, center terminal 62 and upper center terminal 70 of the contactor, conductor 82, start winding 66, and upper right and center right contactor terminals 90 and 122. It will be noted that this winding is energized through the conductor 126 and centrifugal start switch 68 at this time so that the winding 66 is deenergized when the motor 26 reaches approximately a quarter of its operating speed.

The open interlock switch 94 further provides electrical energy through the conductor 186 to maintain the open relay 74 energized through the contact 106 of the switch 94 when the circuit through the open push button 108 is broken due to removal of finger pressure thereon during operation.

In such condition, the motor 26 will rotate in a direction to rotate the shaft 14 to open the door 12 and will continue to rotate until the circuit through the open relay 74 is broken by opening the normally closed stop push button 144, by manual pressure or by opening the open limit switch 34 due to a predetermined angular rotation of the motor 26.

It will be understood that in opening of the door 12, the start winding is deenergized after the door has started in motion and at the time the motor 26 has reached about one quarter of its normal operating speed through opening of the centrifugal start switch 68.

The motor 26 is energized for the rest of the time the door operates in the open direction only through the run winding 46.

Should the close push button 136 be pressed closed during raising of the door 12, the circuit to the close push button 136 and the circuit to the close relay 76 is maintained open due to the normally closed position of the interlock switch 94, that is, with the movable contact 102 in engagement with the fixed contact 106.

Further, if the door is stopped by opening the stop push button 144, the contactor cannot be reversed prior to the motor slowing down sufficiently to close the centrifugal switch 68 on energizing of the close contactor relay 76 since the primary circuit of the transformer 30 cannot be completed through the start switch 68 until the motor 26 slows to one quarter of its operating speed and the switches 96 and 98 have returned to the position shown in FIG. 2 on deenergizing of the open contactor relay 74. Accordingly, there is no power in the secondary of the transformer 30 to energize the close relay 76 to close the bottom set of contactor bars 190, 192 and 194 at this time.

The operation of the door in reverse on closing of the close push button 136 after the start switch 68 has closed again is substantially the same as recited above for the operation of the circuit on closing of the open push button switch 108. Thus, with the start switch 68 closed, the primary of the transformer 30 is energized as before and the primary power on the contactor 28 and through the motor 26 are substantially the same. With energy into the secondary circuit of the transformer, the close relay 76 is energized along with switching of the switches 98 and 100. The close push button switch is in series with the close limit switch, whereby closing of the door will continue until the switch is in a predetermined position at a predetermined angular rotation of the motor 26.

Again, the close interlock prevents operation of the open contactor relay 74 while the close contactor relay 76 is energized and the energizing of the close relay 76 causes the energy to flow through the start wind 66 but in the opposite direction due to the connection of the conductors 86 and 88 through the bottom contactor bars 192 and 194, respectively. Thus, the motor 26 is caused to rotate in the reverse direction and to continue to rotate in the reverse direction until it is cut off by opening of the close limit switch or opening of the stop push button 144.

Accordingly, it will be seen that a method for reversing a standard split phase and capacitive motor is provided by the structure of the invention without the addition of any switches or relays to the standard door operator circuit, which circuit includes a standard motor contactor with four auxiliary switches.

With the circuit of FIG. 2, the method of operation of which is indicated above, it will further be noted that the motor contactor cannot be reversed without the motor start switch being closed which insures motor reverse and solves the problem of motor and door overrun common with present door operator circuits without special switching circuitry to delay reversal of motor operation.

The disclosed structure for and method of motor reversal is thus seen to be particularly simple, economical and efficient.

While one embodiment of the present invention has been considered in detail, it will be understood that other embodiments and modifications thereof are contemplated. It is the intention to include all the embodiments and modifications of the invention as are defined by the appended claims within the scope of the invention.

I claim:

1. Torque reverse motor control structure for use in conjunction with split phase or capacitive start motors capable of operation in both forward and reverse directions comprising a switch for detecting and indicating when the motor has stopped, comprising a motor contactor operably associated with said switch including open and close contactor relays and means operably associated with the motor contactor for preventing reversing of the motor contactor without the switch being closed to insure a positive motor reverse including a transformer having a primary and secondary circuit operably associated with the contactor having the open and close contactor relays in the secondary circuit thereof and the switch in the primary circuit.

2. Structure as set forth in claim 1, wherein the motor control structure further includes limit switches for limiting the operation of the motor in both the forward and reverse directions thereof.

3. Structure as set forth in claim 1, wherein the contactor includes a plurality of auxiliary switches and further including a push button switch having at least open and close portions and the auxiliary switches are connected in circuit with the push button switch for preventing simultaneous energizing of circuits through both open and close push button portions.

4. Structure as set forth in claim 3, and further including means operably associated with the auxiliary switches for switching the auxiliary switches immediately before closing of the contactor to prevent chatter of the contactor.

* * * * *

Disclaimer

4,353,022.—*Richard A. Young*, Little Rock, Ark. TORQUE REVERSING MOTOR CONTROL STRUCTURE AND METHOD. Patent dated Oct. 5, 1982. Disclaimer filed Feb. 20, 1985, by the assignee, *Ceco Corp.*

The term of this patent subsequent to May 5, 1998 has been disclaimed.
[*Official Gazette April 30, 1985.*]